(No Model.) 2 Sheets—Sheet 2.
J. NAYLOR, Jr.
FRUIT JUICE EXTRACTOR.
No. 533,316. Patented Jan. 29, 1895.
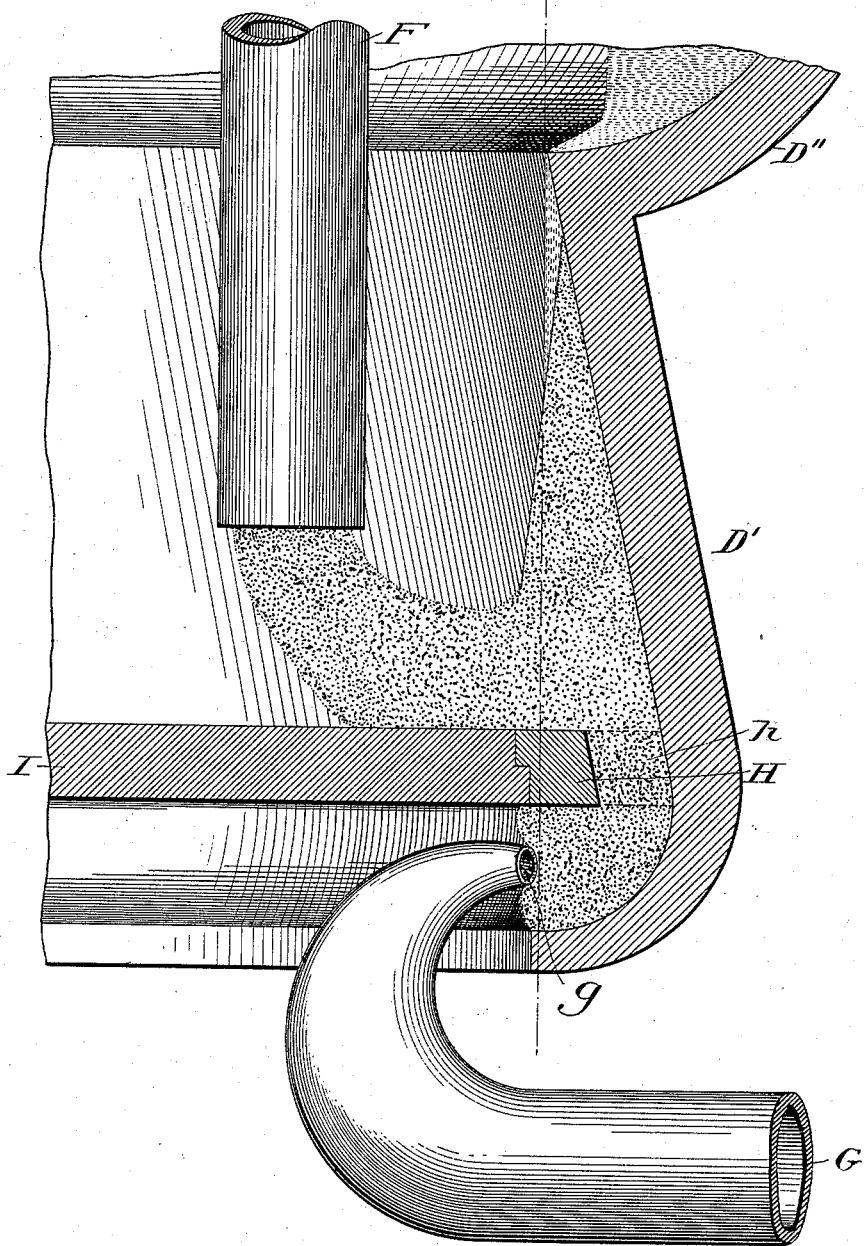
Witnesses.
Geo Taylor
M. J. M. Coughlin
Inventor.
James Naylor Jr.

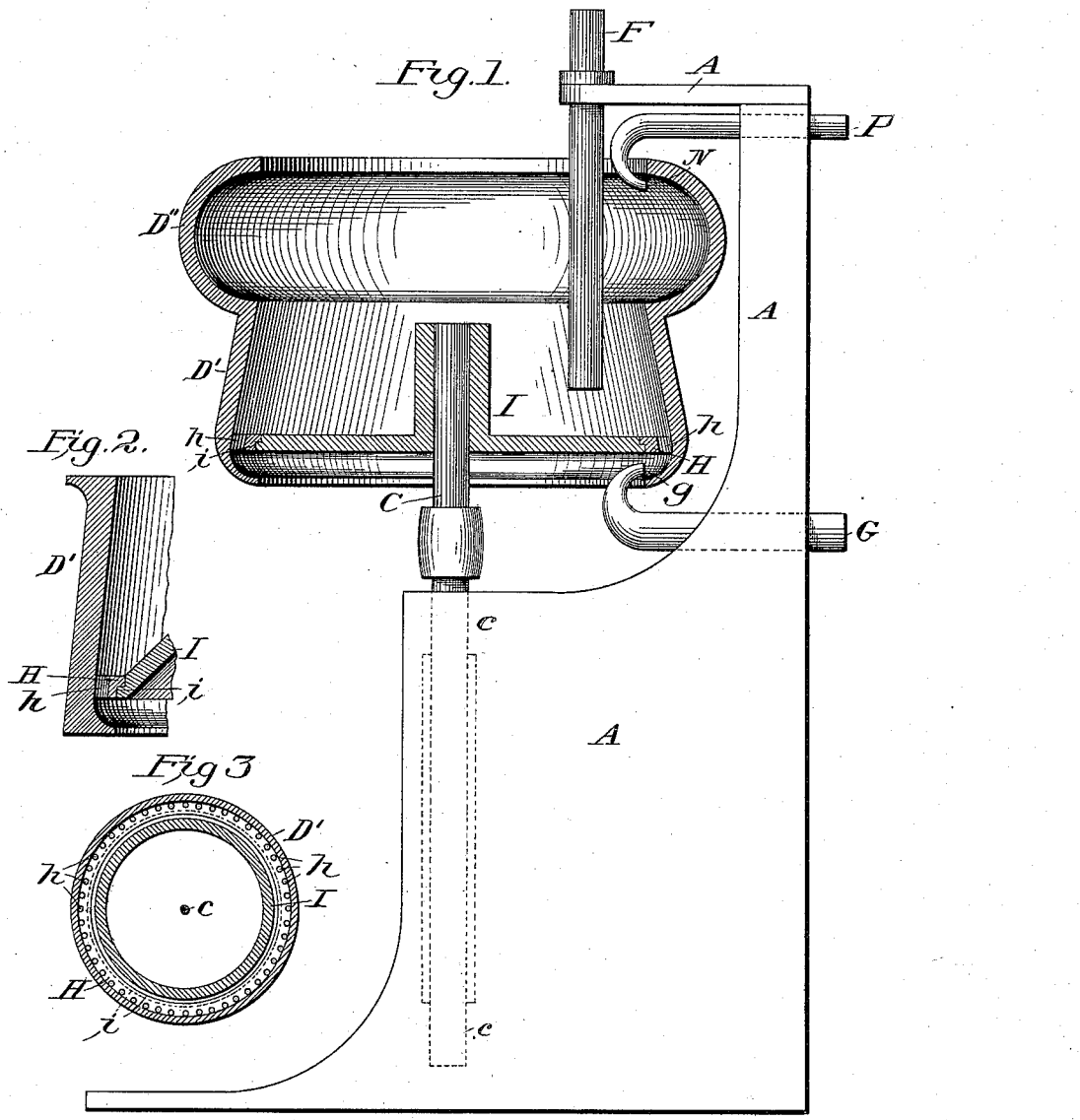

UNITED STATES PATENT OFFICE.

JAMES NAYLOR, JR., OF POUGHKEEPSIE, NEW YORK, ASSIGNOR OF THREE-FOURTHS TO GEORGE THOMAS McLAUTHLIN, OF BOSTON, MASSACHUSETTS.

FRUIT-JUICE EXTRACTOR.

SPECIFICATION forming part of Letters Patent No. 533,316, dated January 29, 1895.

Application filed September 21, 1891. Serial No. 406,378. (No model.)

*To all whom it may concern:*

Be it known that I, JAMES NAYLOR, Jr., a citizen of the United States, and a resident of Poughkeepsie, in the county of Dutchess and State of New York, have invented new and useful Improvements in Fruit-Juice Extractors, of which the following, taken in connection with the accompanying drawings, is a specification.

My improvement relates to a thorough separation of the clear juice from the ground, crushed or macerated fruit, the object being to accomplish same by an apparatus which is cheaper in first cost, than what is now used, and to do more work in less space and time, as also to effect as a result a better article and it consists in subjecting the fruit to the action of centrifugal force in such a manner and in such an apparatus that the clear refined juice is extracted and purified, as will be herein described.

In the drawings Figure 1 shows a sectional elevation of the machine, Figs. 2 and 3 being detail views; Fig. 4, a full sized sectional view showing the movement of the fruit matter during the process.

A A A is the frame of the machine.

C is the arbor having suitable bearings $c\ c$ and driven by a pulley secured thereto. A center-piece or flange I is secured to the arbor upon which the double bowl is mounted. This double bowl is composed of the parts D' and D" which may be solid or joined securely together, but considered herein as distinct bowls.

D' is the bowl or part made to fit upon the center-piece of the arbor. The interior arrangement of this bowl is peculiar, inasmuch, as a solid and a liquid are to be separated within it. The inside diameters at the top and bottom are shown alike. The bottom may be made smaller but never larger. If the lower diameter were any larger, the pressure due to the centrifugal force would drive both solids and liquid downward to a common discharge.

A skimmer $g$ is secured stationary to the frame at the bottom of the bowl D' to cut out the impacted residuum and to force a discharge at the pipe G.

H is a projecting annulus inside the bowl D' having a series of holes $h\ h$ through it. (See Fig. 3.) It also forms a seat for the center piece I by the shoulder $i$ (see Fig. 2) whereby it is held true to the arbor. When in motion the least depth of the contents is merely the overflow of the liquid from which the depth increases regularly to the annular projection and through the openings to the space below near the bottom.

The shape of the bowl D" is such that a maximum quantity of juice may be contained in a minimum amount of metal in a strong and safe manner.

A skimmer N is secured to the frame to take out the refined juice from the upper part of the bowl from which it is discharged.

The operation is as follows:—The pulp being prepared above is conducted by the pipe F to the bowl D', the center piece I serving to hold the inflowing pulp at the best elevation for centrifugal force to effect a separation of the juice from the fibrous and organic matter of the fruit. The former is discharged from the bowl by simply overflowing and by rapid flow it carries much impurity with it; while the latter maintains an accumulated mass of hard fruit matter from which the juice is continually expressed by the compression of said mass, and,—the residuum,— is so hard and compacted at the bottom of the bowl filling up all the holes $h\ h$ and the space below the annulus H that it has to be cut from the machine as a solid by the skimmer $g$ with a forced discharge at G into a suitable receptacle. The juice flows upward throwing off all fibrous and foreign matters held in suspension which are collected and retained at the periphery, where they become compacted and are removed at the end of each half day's work. The refined juice is removed from the bowl by the skimmer N. A certain proportion of air is forced into the skimmer with the juice by the velocity, wherein both are commingled. This I have discovered removes to a certain extent the taint of decayed fruit. This is a most important stage of the process and while it is caused by mechanical means a chemical result is obtained. The fruit juice is discharged clear and in an improved condition to the vessel set to receive it; proof of this being that fermentation is much delayed and when it does occur is more lively.

Having described my invention, what I claim as new, and desire to secure by Letters Patent, is—

1. In a fruit-juice extractor, the bowl mounted upon an arbor, and divided into the parts D' and D'', the part D' sub-divided by the internally projecting annulus into an upper and lower space with communicating openings through said annulus, in combination with means for inflow and discharge as herein shown and described.

2. In a fruit juice extractor the combination with the bowl provided with an internally projecting perforated annulus, said bowl being of different internal diameters at the upper and lower surfaces of said annulus and supported by the center-piece I, on the arbor; of means for inflow thereto and discharges therefrom as herein set forth.

3. The bowl D' having its upper internal diameter the same or more than the lowest internal diameter, an annulus H having openings $h\ h$ and shoulder $i$ located at the point of greatest internal diameter in combination with the center-piece I to hold same to the arbor as shown and described.

4. The removable double bowl consisting of the parts D' and D'' and provided with an annulus H and the shoulder $i$ in combination with the center-piece I having a corresponding shoulder as shown and described.

In testimony whereof I have signed my name to this specification, in the presence of two subscribing witnesses, on this 16th day of September, A. D. 1891.

JAMES NAYLOR, Jr.

Witnesses:
M. B. McLAUTHLIN,
M. W. E. BRUNKHORST.